(12) United States Patent
Stern et al.

(10) Patent No.: US 8,959,504 B2
(45) Date of Patent: Feb. 17, 2015

(54) UPDATE SCANNING

(75) Inventors: Sean Thomas Stern, Seattle, WA (US); David Cris Hennessey, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 92 days.

(21) Appl. No.: 13/275,968

(22) Filed: Oct. 18, 2011

(65) Prior Publication Data

US 2013/0097595 A1 Apr. 18, 2013

(51) Int. Cl.
*G06F 9/44* (2006.01)

(52) U.S. Cl.
CPC ... *G06F 9/44* (2013.01); *G06F 8/68* (2013.01)
USPC .......................................................... 717/171

(58) Field of Classification Search
CPC ............... G06F 8/60; G06F 8/65; G06F 8/67; G06F 8/71; H04L 29/06; H04L 29/08981
USPC .......................................................... 717/171
See application file for complete search history.

(56) References Cited

U.S. PATENT DOCUMENTS

| 6,353,926 | B1 | 3/2002 | Parthesarathy et al. |
|---|---|---|---|
| 6,976,251 | B2 | 12/2005 | Meyerson |
| 6,986,134 | B1 | 1/2006 | Foster |
| 7,003,767 | B2 | 2/2006 | Larkin |
| 7,171,660 | B2 | 1/2007 | McCaleb et al. |
| 7,478,381 | B2 | 1/2009 | Roberts et al. |
| 7,539,686 | B2 | 5/2009 | Shepard et al. |
| 7,584,467 | B2 | 9/2009 | Wickham et al. |
| 7,853,609 | B2 | 12/2010 | Dehghan et al. |
| 8,001,542 | B2 * | 8/2011 | Edwards et al. ............... 717/176 |
| 2004/0015961 | A1 * | 1/2004 | Chefalas et al. ............... 717/178 |
| 2005/0102328 | A1 * | 5/2005 | Ring et al. ..................... 707/201 |
| 2005/0132350 | A1 * | 6/2005 | Markley et al. ............... 717/168 |
| 2006/0031537 | A1 * | 2/2006 | Boutboul et al. ............. 709/228 |
| 2009/0275310 | A1 * | 11/2009 | Fletcher et al. ............. 455/412.1 |
| 2011/0314462 | A1 * | 12/2011 | Clark et al. .................... 717/169 |
| 2012/0226738 | A1 * | 9/2012 | Taneja et al. .................. 709/203 |

OTHER PUBLICATIONS

"HP Client Catalog for Microsoft System Center Products", Retrieved at <<http://h20331.www2.hp.com/Hpsub/downloads/451290-003b.pdf>>, Sep. 16, 2011, pp. 51.

* cited by examiner

*Primary Examiner* — Qing Chen
*Assistant Examiner* — Andrew M Lyons
(74) *Attorney, Agent, or Firm* — Bryan Webster; Kate Drakos; Micky Minhas (57) ABSTRACT

One or more techniques and/or systems allow for updates (e.g., questions) to be provided via sync calls to a server (e.g., in determining whether (non-question) software updates should be installed on a client device), where the total number of updates exceeds single sync call server limitations. For example, relationships between updates may be determined and updates may be grouped into two or more sets based upon the relationships, where different sets can independently be transmitted to the server in different sync calls. Grouping updates according to the policies provided mitigates errors that may otherwise occur when making multi-sync calls (e.g., asking a second question before a first question where the second question should follow the first question because the relevance of the second question depends upon an answer to the first question).

20 Claims, 6 Drawing Sheets

UPDATE SCANNING

BACKGROUND

Software updates are frequently provided to electronic devices from hardware and/or software providers. Such updates may be intended to, among other things, improve functionality of the hardware/software and/or reduce security risks associated with such hardware/software.

To provide software updates that are relevant to the electronic device (e.g., that are useful given the hardware/software configuration of the device), the provider generally collects information about the hardware and/or software comprised within and/or operating upon the electronic device. In some applications this is a relatively easy task because few, if any, changes are made to the software/hardware once it is shipped by the manufacturer. However, in other applications, the hardware/software on an electronic device can vary significantly and/or can be modified after shipment of the electronic device. For example, the number of possible hardware/software configurations on computers and/or mobile device can be virtually limitless.

In applications where there are can be numerous variations in hardware/software configurations, the provider (e.g., an updating service) generally transmits to the electronic device (e.g., a client device) one or more questions (e.g., referred to herein as updates). The electronic device may proceed to process the one or more updates and send answers (e.g., referred to herein as states), typically along with the updates, (back) to the updating service. Based upon the states, the updating service may provide additional updates (e.g., if additional updates would be useful given the answers to the previous updates/questions). Once the updating service has determined that there are no more questions to be asked, the updating service may provide to the client device one or more software (non-question) updates that are relevant to the electronic device based upon the responses to the updates.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for syncing with an updating service are provided. Generally speaking, the updates (e.g., questions) and respective states (e.g., answer to respective question) are divided into at least two different sync calls, where respective sync calls are transmitted to a server (e.g., or other updating service provisioning device) independently. In this way, the number of updates and/or states that a client may transmit (back) to the updating service is not limited by limitations imposed by a server of the updating service that is receiving the updates and/or states, for example (e.g., as will be described in more detail below).

It will be appreciated that generally speaking, updates and/or states may not be arbitrarily divided into two or more sync calls because errors may occur. For example, if a first update is transmitted in a sync call without one or more updates that are preconditions for the first update, the updating service may view the first update as out of scope because it does not see that the preconditions have been met. Therefore, in one embodiment, a dependency tree or other model may be created indicative of how updates depend from one another (e.g., which updates are preconditions for other updates). Using this dependency tree and/or other model that accurately reflects such preconditions, two or more sets of updates can be identified, where respective sets of updates can be sent from the client to the updating server in different sync calls.

By way of example, a basis update may be selected from the dependency tree and/or other model and one or more preconditions for the basis update may be identified and bundled as a first set of updates. Further, other updates whose preconditions are satisfied (e.g., are included) in the first set of updates may be added to the first set of updates. A similar process may be applied to the creation of other sets of updates, where respective sets of updates may be transmitted in different sync calls.

It will be appreciated that additional features to the systems and/or techniques may be described below and the benefits of splitting the updates/states into a plurality of sync calls (e.g., based at least in part upon the aforementioned techniques) may be realized from the following description.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Clients (e.g., such as computers, mobile devices, and/or other electronic devices) often identify software updates, or rather have available software updates identified for the clients, by syncing with an updating service. The sync generally involves the updating service sending updates (e.g., questions) to the client and the client responding to the updates in a single sync call. Based upon update states (e.g., answer to the questions) and the relationships between updates, the updating service may be configured to make determinations regarding the client. For example, the updating service may, among other things, provide new updates for the client to evaluate (e.g., answer), notify the client that one or more updates are no longer relevant and can be removed from the cache of a client, etc.

Conventionally, when a client issues a sync call to the updating service, the sync call comprises all of the updates (e.g., questions) and/or states (e.g., answers to the questions) stored in a cache of the client, and not just more recently received updates. It will be appreciated that this behavior generally occurs because the updating service does not maintain a state of the client (e.g., does not keep records regarding particular hardware/software configurations of any one client and/or records regarding previous states of the client). Thus, an updating service may have little to no record of a client (e.g., because storing such information may present a security risk and/or because maintaining such state about respective clients may be memory intensive).

As the number of updates relevant to a client grows (e.g., over time), so does the amount of information (e.g., file size) transmitted in the sync call that is received by a server of the updating server. However, it will be appreciated that if a server(s) of the updating service were forced to accept an arbitrary number of updates/states (e.g., questions and/or answers) (e.g., which is dependent upon the particular software/hardware configuration of the device and therefore may vary widely), it might expose the server to numerous risks. For example, among other thing, server-side scalability may be reduced because sync calls comprising a large amount of data may need to be handled by individual servers and/or one or more servers of the updating service may be vulnerable to DoS attacks (e.g., where a nefarious programmer sends a large amount of information to the server, causing the processing capability of the server to be utilized for an extended (e.g., indefinite) period of time). Therefore, to reduce such risks, the server(s) of the updating service generally impose limits on a maximum number of updates and/or states acceptable in a given sync call and/or a maximum amount of data that can be transmitted over a single sync call.

As a result of the limits imposed by the server(s), sync calls generally comprise no more than a specified number of updates/states. It will be appreciated that limiting the number of updates/states and/or limiting the amount of data at a level below and/or equal to server limitations, generally limits that number of updates that the updating service can ask the client (e.g., limiting the ability of the updating service to adequately assess the present software/hardware configurations of the client and/or to provide useful updates). Conventionally, if the updating service preferred to provide additional updates (e.g., questions) to the client beyond what was capable of being returned to the updating server in a single sync call (e.g., to garner additional information), the limits on the server may have been increased and/or removed (e.g., exposing the server to greater risks and/or reducing server-side scalability).

It will be appreciated that traditionally the client transmits the updates and/or states in merely a single sync call because some updates are preconditions for other updates (e.g., an update may be a prerequisite for another update), and thus the updating server (e.g., which doesn't maintain state about the client), needs to be aware of the client's answer to both the update and the one or more updates that are preconditions to the update for the updating service to adequately determine whether one or more new updates are to be transmitted to the client and/or whether one or more of the previously transmitted updates are to be revised and answered again by the client. If the client omits an update in the sync call to the updating service and/or the sync call otherwise becomes incomplete (e.g., does not comprise all of the updates and/or states), the server could construct an incorrect client view (e.g., notion of the hardware/software configuration of the client) and/or errors could occur. For example, the omission of a first update with the inclusion of the preconditions of the first update in a sync call could result in the updating service reissuing the first update as new (e.g., when in fact the client has previously received the first update) and/or the omission of one or more updates that are preconditions for a second update included in the sync call may result in the updating service responding to the client the second update is out of scope when in fact the client is aware of the preconditions. As another example, the omission of a third update that is a precondition for a new update may result in the new update not being provided to the client (e.g., when it was in fact relevant to the hardware/software configuration).

Thus, systems and/or techniques are described herein that provide for, among other things, providing the updates/states to the updating service in two or more sync calls while limiting (e.g., to zero) the number of errors described above. As will be described in more detail below, respective sync calls may comprise what is referred to herein as a set of updates and/or an Independently Updatable Subset (IUS). In one embodiment, respective sets of updates may comprise, among other things, a basis update (e.g., a update that acts as a starting reference for determining which updates to include in the IUS), preconditions for the basis update (e.g., that have been provided to the client (e.g., cached)), and/or updates whose preconditions are satisfied (e.g., comprised within) the updates already included in the IUS.

It may be appreciated that there are numerous benefits to the systems and/or techniques described herein. For example, the number of updates/states transmitted in a sync call may be reduced, allowing the server to comprise acceptance limits that reduce risks to the server and/or promote server-side scalability. As another example, a virtually limitless number of updates may be provided to the client without concern for limits imposed on sync calls by the server(s) of the updating service.

Figure 1:
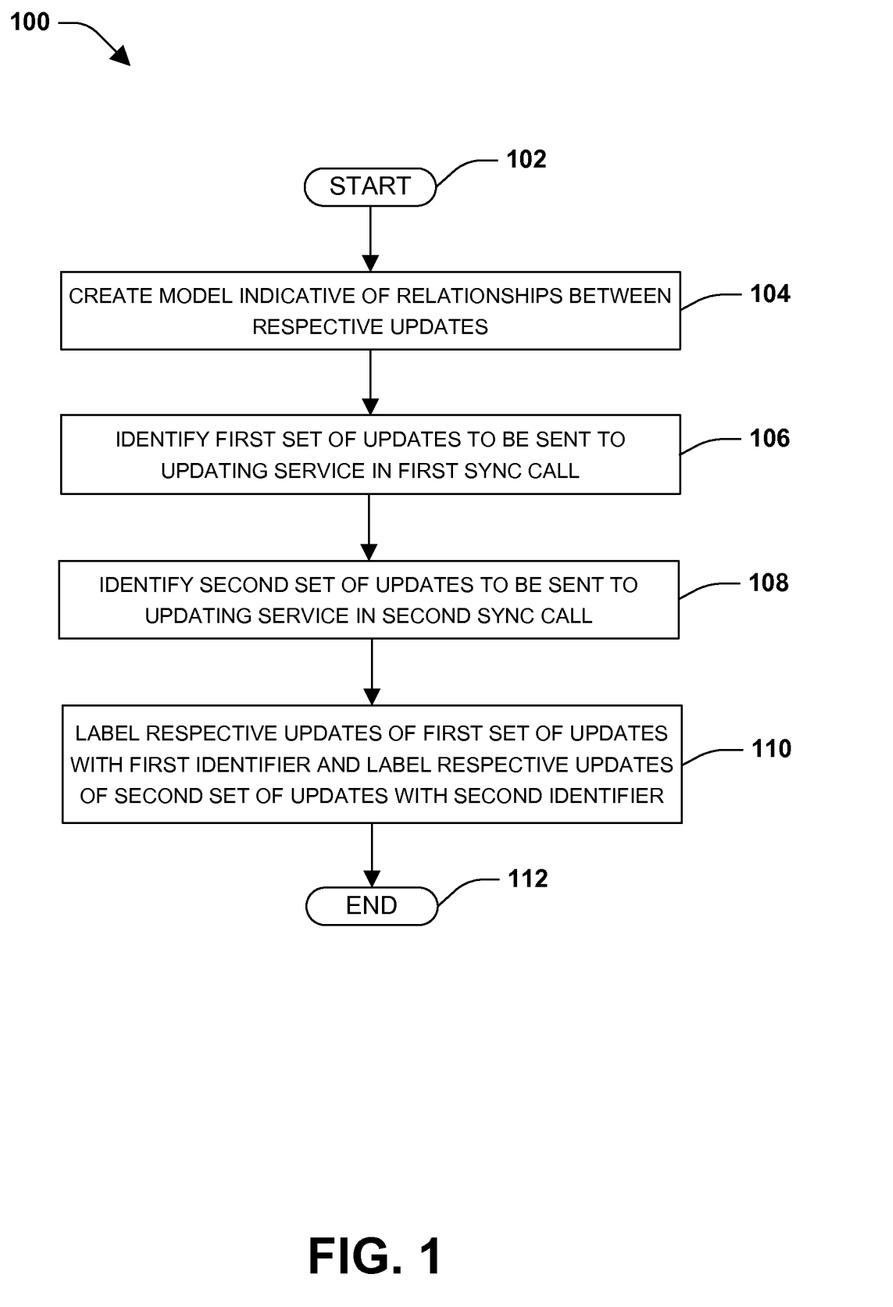
FIG. 1 is an exemplary method for managing software updates.

FIG. 1 illustrates an example method 100 for managing software updates. More particularly, the example method illustrates a process for identifying two or more sets of updates that may be respectively provided to an updating service via a sync call (e.g., a first sync call may comprise a first set of updates/states, a second sync call may comprise a second set of updates/states, etc.). In this way, the updating service can determine a hardware/software configuration of the client and/or identify software (non-question) updates relevant to the client.

The example method 100 begins at 102, and a model(s) is created indicative of relationships between at least some of the updates at 104. For example, in one embodiment, a dependency tree representing preconditions (e.g., prerequisite updates) for respective updates is created, where respective nodes in the dependency tree are representative of an update and/or where lines connecting two or more nodes are indicative of a relationship between the nodes. However, other types of models for modeling such relationships are also contemplated.

The model created at 104 may be created by the updating service (e.g., created server-side) and/or may be created by the client (e.g., client-side) and may depend upon whether the updating service and/or the client are aware of the relationships between the updates. As an example, in one embodiment, the client may not be provided information about such relationships (e.g., dependencies), and thus the updating service (e.g., which is generally aware of such relationships because it is tasked with providing additional updates based upon received answer to previously asked updates), may be configured to create the model. In another embodiment, such relationship (e.g., dependency) information may be provided to the client and/or the client may determine such relationship information (e.g., with or without the assistance of the updating service), and thus the client may be configured to create the model at 104.

The example method 100 further comprises identifying a first set of updates to be sent to the updating service in a first sync call at 106 and identifying a second set of updates to be sent to the updating service in a second sync call at 108. While the first and second sets of updates are different, there may be some overlap between the first and second sets of updates, although such an overlap is not required. That is, stated differently, the first set of updates may comprise one or more updates also comprised in the second set of updates, but there is generally at least one update comprised in the second set of updates that is not included in the first set of updates and/or at least one update comprised in the first set of updates that is not comprised in the second set of updates.

Moreover, it will be appreciated that while reference is made to identifying sets of updates to be sent to the updating service, such identification does not need to be performed by the same component and/or device that is sending the updates to the updating service. For example, in one embodiment (e.g., where merely the updating service is aware of the dependencies between updates), the updating service may be configured to identify the first and second sets of updates and to communicate to the client which sets of updates are to be sent in respective sync calls (e.g., via a labeling technique described below). As described above, in another embodiment, the client may be made aware of the dependencies/prerequisites for respective updates and/or determine such dependencies/prerequisites, and the client may be configured to identify respective sets of updates with or without assistance from the updating service, for example.

As will be described in more detail with respect to the proceeding figures, respective update sets generally comprise a basis update from which it is determined what other updates to include in the set of updates. For example, the first set of updates generally comprises a first basis update, the second set of updates generally comprises a second basis update that is different than the first basis update, etc. In one embodiment, the updating service and/or client may (e.g., at least initially) treat respective updates as a basis update and determine which updates would be included in the set of updates if that particular update were the basis update (e.g., each update is treated as a basis update and a set of updates is created therefrom). Thus, there may be a one-to-one ratio of the number of updates to the number of sync calls (e.g., because each update may be treated as a basis update for one set of updates). Alternatively, in another embodiment, a determination may be made whether a first set of updates (e.g., formed from a first basis unit) is entirely comprised within another set of updates (e.g., formed from a second basis unit), such that the first set of updates may not be sent as its own sync call (e.g., because all of the updates can be sent in another sync call, thus reducing the total number of sync calls to be sent to the updating service).

By way of example, suppose that a third set of updates is identified based upon a third basis update. However, the third set of updates comprises updates that are already comprised within one of the first and second sets of updates (e.g., the third set of updates is comprised, in its entirety, within at least one of the first and second sets of updates). Creating a sync call for the third set of updates may be redundant because such updates are already included (in their entirety) in one or more of the first and second sets of updates. Therefore, to reduce a number of sync calls transmitted to the updating service, a third sync call may not be created and/or sent to the updating service (e.g., minimizing/optimizing the number of sync calls). It will be appreciated that such a feature may be more understandable in view of FIGS. 2-6 and the accompanying description.

The example method 100 also comprises labeling respective updates of the first set of updates with a first identifier and labeling respective updates of the second set of updates with a second identifier at 110. As an example, updates comprised in the first set of updates may be labeled "1" and updates comprised in the second set of updates may be labeled "2." When an update is comprised in both the first and second sets of updates, the update may be labeled with both a "1" and a "2" (e.g., and may be sent to the updating service in both the first and second sync calls). Such labeling may find particular applicability in environments where the first and second sets of updates are identified by the updating service (e.g., or other server-side service) to provide an indication to the client of which updates to send in which sync call, although it may also be applicable to situations where the clients makes such identifications. In this way, the client may be made aware of which updates to include in respective sync calls, for example (e.g., particularly in applications where the client is unaware of dependencies between updates).

The example method 100 ends at 112.

Figure 2:
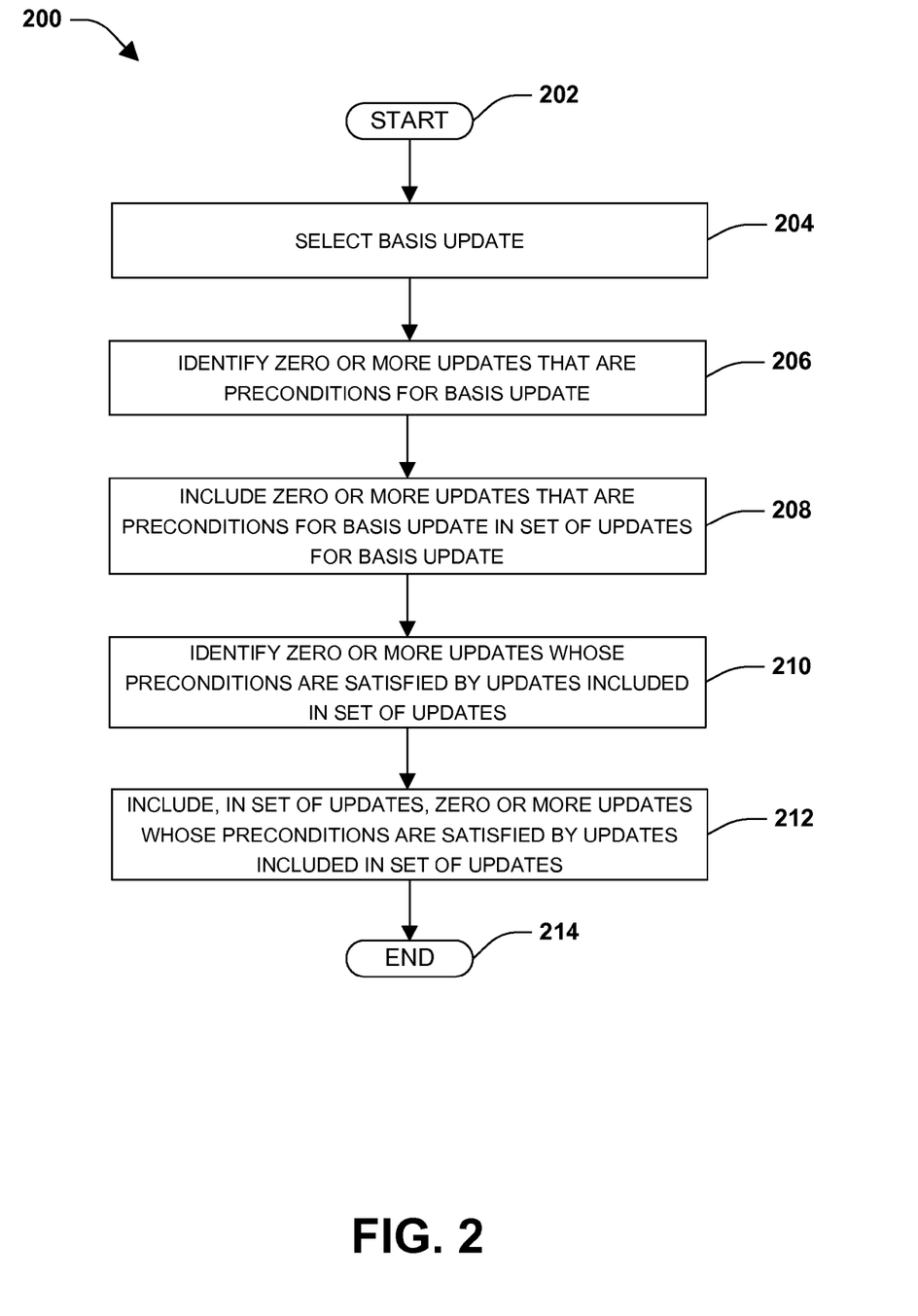
FIG. 2 is an exemplary method for identifying a set of updates to be sent to an update service.

FIG. 2 illustrates an exemplary flow diagram of an example method 200 for identifying a set of updates to be sent to an update service. For example, the method 200 may be used to identify the first set of updates to be sent to the updating service in a first sync call at 106 in the example method 100 and/or to identify the second set of updates to be sent to the updating service in a second sync call at 108 in the example method 100 of FIG. 1.

The example method 200 begins at 202 and a basis update for the set of updates being identified is selected at 204. Generally speaking, the basis update may be any one of the plurality of updates known to the updating server and/or known to the client (e.g., which may be a subset of those known to updating server). For example, in one embodiment, the updating service may begin by selecting a first update as a basis update and identifying a set of updates to be included in a first set of updates based upon the first update. The updating service may then proceed by making respective remaining updates (e.g., each of the other updates) a basis update and creating a set of updates therefrom until substantially all of the updates have been selected as a basis update. In another embodiment, fewer than all of the updates may be selected as basis updates. For example, in one embodiment, merely the lowest level update in a branch on a dependency tree is selected as a basis update.

At 206 in the example method 200, zero or more updates that are preconditions (e.g., prerequisite updates) for the basis update are identified. By way of example, in one embodiment, the basis update may have as preconditions (e.g., the basis unit depends upon and/or is a child, grandchild, etc. of) first and second updates, so the first and second updates are identified and included in the set of updates that is created based upon the selected basis update. It will be appreciated that has used herein, the terms precondition and/or prerequisite may be used interchangeably and generally are intended to mean that an update is a function of and/or dependent upon another update. For example, an update may relate to whether the client comprises a particular piece of software and may be provided to the client (e.g., asked to the client) merely if the client specifies in response to another update that the client comprises a 64-bit operating system. Therefore, the update relating to whether the client comprises a particular piece of software may be dependent upon an update relating to whether the client comprises a 64-bit operating system (e.g., because the update relating to whether the client comprises a particular piece of software is merely asked if the client indicates in the other update that the client is operating a 64-bit operating system). That is, stated differently, the update relating to whether the client comprises a particular piece of software is merely sent to the client if the client comprises a 64-bit operating system (e.g., because the update relating to whether the client comprises the particular piece of software is less significant if the client comprises a 32-bit operating system (e.g., because there is not a software update for the particular piece of software if it is running in a 32-bit environment)).

At 208 in the example method 200, the identified updates (e.g., if any) that are preconditions for the basis update are included in the update set derived based at least in part upon the basis update selected at 204. It will be appreciated that preconditions for the basis update are included in the set of updates that is created based upon the basis update to mitigate errors that might occur when preconditions for an update are omitted from a sync call. For example, as described above, the updating service may conclude that the basis update is out of scope if one or more preconditions for the basis update are not included in the sync call comprising the basis update.

By way of example, suppose the updating service has specified that an update relating to whether the client comprises a particular piece of software is dependent upon the client responding to another update that it comprises a 64-bit operating system. If a sync call comprises a response to the update relating to whether the client comprises a particular piece of software, but fails to respond to the update relating to whether the client comprises a 64-bit operating system in the same sync call, the updating service may be unaware that the client has indeed responded appropriately to the update regarding the 64-bit operating system and may determine that the response to the update relating to whether the client comprises a particular piece of software is out of scope (e.g., the update was asked out of order). However, because the example method provides that preconditions for the basis update are included in the update set, an update may not be able to become out of scope. For example, if the update relating to whether the client comprises a particular piece of software is the basis update, the updating relating to whether the client comprises a 64-bit operating system is included in the sync call (e.g., lessening the possibility that an update can be identified as out of scope).

At 210 in the example method 200, zero or more updates whose preconditions are satisfied by the updates included in the set of updates (e.g., satisfied by the basis update and/or updates that are preconditions for the basis update) are identified, and are included in the set of updates created based upon the basis update at 212. Stated differently, updates whose preconditions are satisfied by updates already included in the set of updates (e.g., the basis update and/or the updates that are preconditions for the basis update) are included in the set of updates derived at least in part from the basis update. It will be appreciated that typically, merely those updates whose preconditions are completely satisfied are identified and/or included in the set of updates (e.g., as opposed to those updates whose preconditions are merely partially satisfied by the updates included in the set of updates).

The method 200 ends at 214.

It will be appreciated that the example methods 100 in FIGS. 1 and 200 in FIG. 2 are merely intended to be example methods for creating sets of updates that may be sent to an updating service in two or more sync calls and are not intended to be interpreted in a limiting manner, such as necessarily limiting the scope of the claims. For example, in one embodiment, labeling updates of a set of updates as described with respect to 110 in FIG. 1 may be an optional action that the updating service and/or client may or may not perform, for example. Moreover, while it may be preferable to identify and/or include updates whose preconditions are satisfied by updates included in the set of updates (e.g., to reduce the total number of sync calls sent to the updating service), it will be appreciated that in one embodiment, a set of updates may merely comprise a basis update and zero or more updates that are preconditions for the basis update.

FIGS. 3-6 represent example models, where respective models illustrate updates that may be comprised in an update set based upon a selected basis update. More particularly, FIGS. 3-6 illustrate example dependencies trees 300, 400, 500, 600, where respective nodes, labeled A-K, represent updates and lines connecting two or more nodes represent a relationship between the updates. Moreover, it will be appreciated that for purposes of clarity, in the example models, the node representing the basis update for the set of updates that is being created in that model is outlined in a dash pattern, nodes representing updates that are preconditions for the basis update (e.g., and thus included in the set of updates) are outlined in a dot pattern, and nodes representing updates that may be included in the set of updates because the preconditions of the update have been satisfied by the updates included in the set of updates are outlined in a dash, dot, dot pattern. Updates represented by nodes with a solid line pattern are generally not included in the set of updates that is created for the particular basis update that is selected in respective figures.

It will be appreciated that FIGS. 3-6 may provide a better understanding of the methods 100, 200 described with respect to FIGS. 1 and 2. Therefore, reference may be made back to FIGS. 1 and 2 when describing actions that are illustrated in FIGS. 3-6. However, FIGS. 3-6 are merely intended to be example models, and are not intended to be interrupted as limiting the scope of the instant disclosure, including the methods described above and/or the appended claims.

Figure 3:
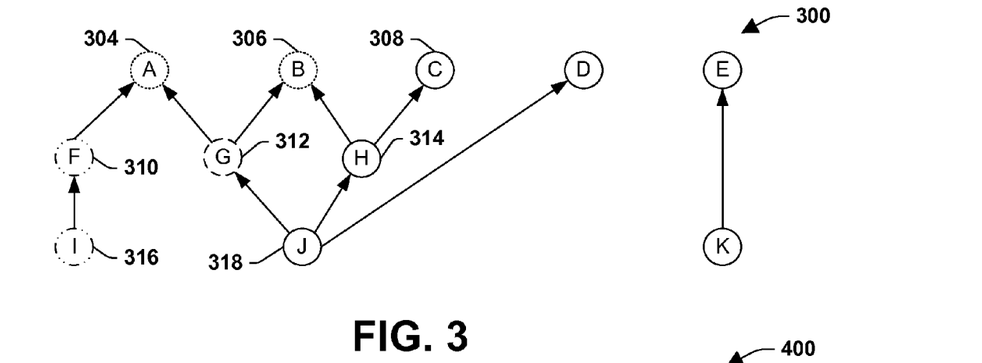
FIG. 3 illustrates an exemplary model illustrating relationships between updates.

To create a set of updates (e.g., an independently updatable subset) that can be transmitted to an updating service in a sync call, an update may be selected to use as a basis update from which to determine what other updates to include in the set of updates being created (e.g., as described with respect to 204 in the example method 200). In the example dependency tree 300, the updated represented by node G 312 is selected as the basis update for a first set of updates. However, it will be appreciated that the basis update may be any one of the available updates (e.g., represented by nodes A-K), and is merely used as a starting point from which to determine what updates to include in the update set given that particular update as the basis.

Next, one or more preconditions for the basis update may be identified and/or included in the first set of updates (e.g., which at this stage merely comprises the basis update) (e.g., as explained in acts 206 and 208 of example method 200 in FIG. 2). In the illustrated dependency tree 300, nodes A 304 and B 306 represent updates that are preconditions for node G 312, which represents the basis update, so updates represented by nodes A 304 and B 306 may be included in the set of updates being created. It will be appreciated that nodes A 304 and B 306, from which node G 312 depends, do not depend from any other nodes (e.g., nodes A 304 and B 306 are not preconditioned on other nodes), so there do not appear to be other preconditions, besides those represented by nodes A 304 and B 306, that are to be included in the first set of updates on the grounds that they are preconditions for the basis update.

Additionally, one or more updates whose preconditions are satisfied by updates comprised in the first set of updates may be identified and/or included in the first set of updates (e.g., which presently comprises updates represented by nodes A 304, B 306, and G 312) (e.g., as explained in acts 210 and 212 of example method 200 in FIG. 2). That is, stated differently, updates whose preconditions are satisfied by the inclusion of updates represented by nodes A 304, B 306, and G 312 may be included in the first set of updates (e.g., although inclusion of these updates may be optional to satisfy server limitations). For example, if the inclusion of updates whose preconditions are satisfied by updates comprised in the first set of updates would cause the first set of updates to comprise a number of updates that exceeds a threshold that a server is willing to accept, one or more of these updates may not be included in the first set of updates.

As illustrated, updates represented by nodes F 310 and I 316 may be included in the first set of updates because the preconditions of both of these updates appear to be satisfied by the inclusion of node A 304 in the first set of updates. Stated differently, the update represented by node F 310 is preconditioned on node A 304, which is included in the first set of updates (e.g., because it was a precondition for the basis update represented by node G 312). The update represented by node I 316 may be include in the first set of updates because the update represented by node I 316 is merely preconditioned on the update represented by node F 310 (e.g., which, as already stated, can be included in the first set of updates because the update represented by node F 310 is merely preconditioned on the update represented by node A 304).

It will be appreciated that while preconditions for updates represented by nodes H 314 and J 318 are partially satisfied by the updates included in the first set of updates, they are not fully satisfied. Thus, these updates are generally not included in the first set of updates (e.g., because errors might occur). For example, updates represented by node B 306 and node C 308 are preconditions for the update represented by node H 314. While the update represented by node B 306 is included in the first set of updates (e.g., because the update represented by node B 306 is a precondition for the basis update represented by node G 312), node C 308 is not included in the first set of updates (e.g., because the update represented by node C 308 is not a precondition for the basis update represented by node G 312 and/or is not satisfied by the updates represented by nodes A 304, B 306, and G 312, which were previously included in the first set of updates). Therefore, in one embodiment, the update represented by node H 314 is not included in the first set of updates.

Similarly, preconditions for the update represented by node J 318 are merely partially satisfied by the updates included in the first set of updates. For example, while the update represented by node G 312 is included, the update represented by node H 314 is not included (e.g., for the foregoing reasons). Therefore, the update represented by node J 318 may not be included (e.g., to reduce errors at the updating service when a sync call is received).

By way of example, the basis update represented by node G 312 may relate to an update pertaining to whether the client comprises a first piece of software, and the update represented by node A 304 may relate to a question pertaining to whether the client comprises a 64-bit operating system. If the question pertaining to whether the client comprises the first piece of software (node G 312) is asked merely if the client comprises a 64-bit operating system (node A 304), the question pertaining to whether the client comprises the first piece of software (node G 312) may be said to be preconditioned on the client responding to the update represented by node A 304 that the client comprises a 64-bit operating system (as depicted in the (tree) model illustrated in FIG. 3). Therefore, if the update represented by node G 312 is selected as the basis update, the update represented by node A 304 may be included in the first set of updates (e.g., because it is a precondition of the update represented by node A 304). Moreover, one or more other updates that are preconditions on the client comprising a 64-bit operating system (node A 304) may also be included in the first set of updates. For example, the update represented by node F 310 may relate to whether a second piece of software is installed on the client (e.g., which may be unrelated to whether the first piece of software is installed on the client (node G 312)) and may merely be dependent upon the client comprising a 64-bit operating system (node A 304). Therefore, if the update represented by node A 304 relating to whether the computer comprises a 64-bit operating system is included in the first set of updates, the update represented by node F 310 may also be included in the first set of updates. Similarly, if the update represented by node F 310 is selected as the basis update then the precondition update represented by node A 304 would be included in the corresponding set of updates.

In contrast to the update represented by node F 310, which is merely preconditioned on the update represented by node A 304, the update represented by node J 318, for example, is dependent upon the update represented by node G 312 and the update represented by node H 314. For example, the update represented by node J 318 may be applicable merely if the client comprises the first piece of software and a first service package. Node G 312, which is included in the first set of updates, may pertain to whether the client comprises the first piece of software. However, node H 314, which may pertain to whether the client comprises a first service package, is not included in the first set of updates (e.g., because it is not the basis update, it is not a precondition for the basis update, etc.). Therefore, because it is unclear from the first set of updates whether the client comprises the first service package, the update represented by node J 318 may not be included in the first set of updates even though it is known from the response to the update represented by node G 312 whether the client comprises the first piece of software (e.g., because it is not clear from the updates comprised in the first set of updates whether the client also comprises a first service package represented by node H 314).

Figure 4:
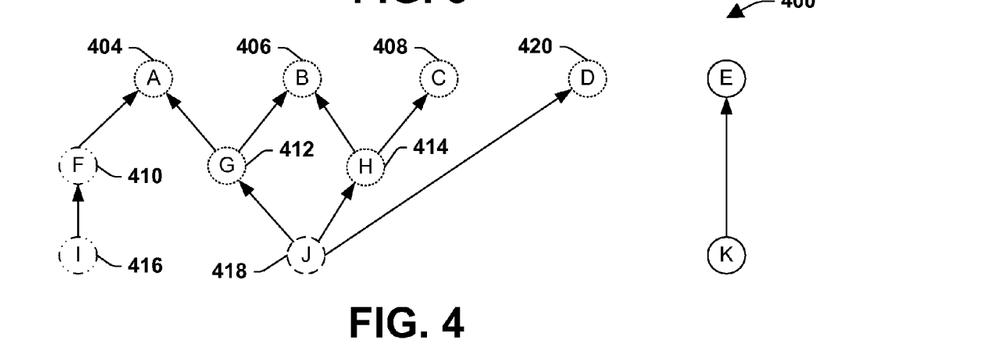
FIG. 4 illustrates an exemplary model illustrating relationships between updates.
Figure 5:
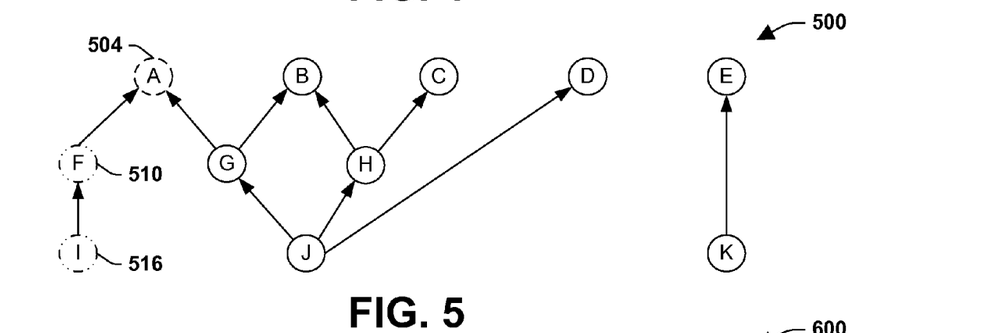
FIG. 5 illustrates an exemplary model illustrating relationships between updates.
Figure 6:
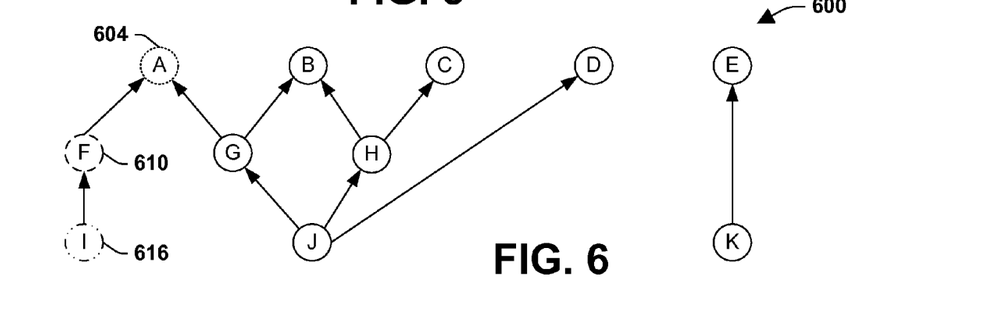
FIG. 6 illustrates an exemplary model illustrating relationships between updates.

It will be appreciated that the creation of other sets of updates using other basis (e.g., as illustrated in FIGS. 4-6), may follow a similar method to that described with respect to FIGS. 2 and 3. However, for purposes of brevity, the method for determining which updates to include as a function of a selected basis update may be described less thoroughly.

For example, the dependency tree 400 of FIG. 4 illustrates which updates may be included in a second set of updates if the update represented by node J 418 (e.g., 318 in FIG. 3) is selected as the basis node. Updates represented by nodes A 404, B 406, C 408, D 420, G 412, and H 414 may be identified and/or included in the second set of updates because these updates are illustrated as being preconditions for the basis update represented by node J. Moreover, in one embodiment, updates represented by nodes F 410 and I 416 may be identified and/or included in the second set of updates because the precondition of these updates (e.g., the update represented by node A 304) is included in the second set of updates.

Dependency tree 500 of FIG. 5 illustrates yet another example, where a third set of updates is created based upon the selection of an update represented by node A 504 (e.g., 304 in FIG. 3) as the basis update. It will be appreciated that the update represented by node A 504 does not appear to have other updates as preconditions, so no updates may be added to the third set of updates on grounds that they are preconditions for the basis update. However, in one embodiment, updates represented by nodes F 510 and I 516 may be identified and/or included in the third set of updates because the precondition of these updates (e.g., the update represented by node A 304) is included in the third set of updates. More particularly, merely the update represented by node A 504 is a precondition for the update represented by node F 510, so the update represented by node F 510 may be included. Moreover, merely the update represented by node F 510 is a precondition for the update represented by node I 516. Therefore, as long as the update represented by node F 510 is included in the third set of updates, the update represented by node I 516 may also be included in the third set of updates.

Dependency tree 600 of FIG. 6 illustrates yet another example, where a fourth set of updates is created based upon the selection of an update represented by node F 610 (e.g., 310 in FIG. 3) as the basis update. The dependency tree 600 provides that the update represented by node A 604 is a precondition for node F 610, so the update represented by node A 604 may be included in the fourth set of updates. Additionally, the update represented by node I 616 may be identified and/or included in the fourth set of updates because the precondition of this update (e.g., the update represented by node F 610) is included in the third set of updates.

It will be appreciated that the four sets of updates described herein are merely example sets of updates that can be derived from a dependency tree, such as the dependency tree illustrated in FIGS. 3-6. That is, stated differently, it will be appreciated respective updates represented by a node in the dependency tree can be selected as a basis update and that a set of updates can be created therefrom. For example, in the dependency tree 300 of FIG. 3 there are 11 nodes, respectively representing an update. Therefore, 11 sets of updates could be created to be sent to the updating service in a different sync call.

It will also be appreciated that there may be some duplication in the sets of updates that are created if respective updates of the model 300 are used as a basis update. For example, the third set of updates illustrated in the dependency tree 500 of FIG. 5 includes the same updates that are included in the fourth set of updates illustrated in the dependency tree 600 of FIG. 6. Moreover, one or more sets of updates may include every update included in one or more other sets of updates (e.g., making the creation of these other sets less meaningful unless the set that includes every update is too large for a server of the updating service to accept). By way of example, if the update represented by the node J 418 (e.g., in the dependency tree 400 illustrated in FIG. 4) is selected as the basis update, the updates comprised in the first, third, and fourth sets of updates (e.g., illustrated in FIGS. 3, 5, and 6) are entirely comprised within the second set of updates (e.g., illustrated in FIG. 4). Therefore, in one embodiment, a determination may be made regarding whether one or more sets of updates comprise updates that are included (e.g., in their entirety) in one or more other sets of updates. If a determination is made that updates comprised within a set of updates are also comprised within another set of updates, one or more of the sets of updates may be discarded and/or ignored (e.g., such that merely one sync call is transmitted to the updating service as opposed to the two sync calls that would be sent if both sets of updates remained intact). In this way, the number of sync calls that may be made to a server of the updating service may be reduced (e.g., optimizing the number of calls transmitted).

However, it will be appreciated that even if the update represented by node J is selected as the basis update, not all of the nodes may be transmitted as a single sync call. For example, referring back to FIG. 4 and the dependency tree illustrated therein, it will be appreciated that the updates represented by nodes E and K were not included in the second set of updates. Therefore, in one embodiment, the updates represented by nodes E and K may be comprised within a fifth set of updates and the fifth set of updates may be transmitted as a separate sync call (e.g., independent of the sync call through which the second set of updates is transmitted).

Figure 7:
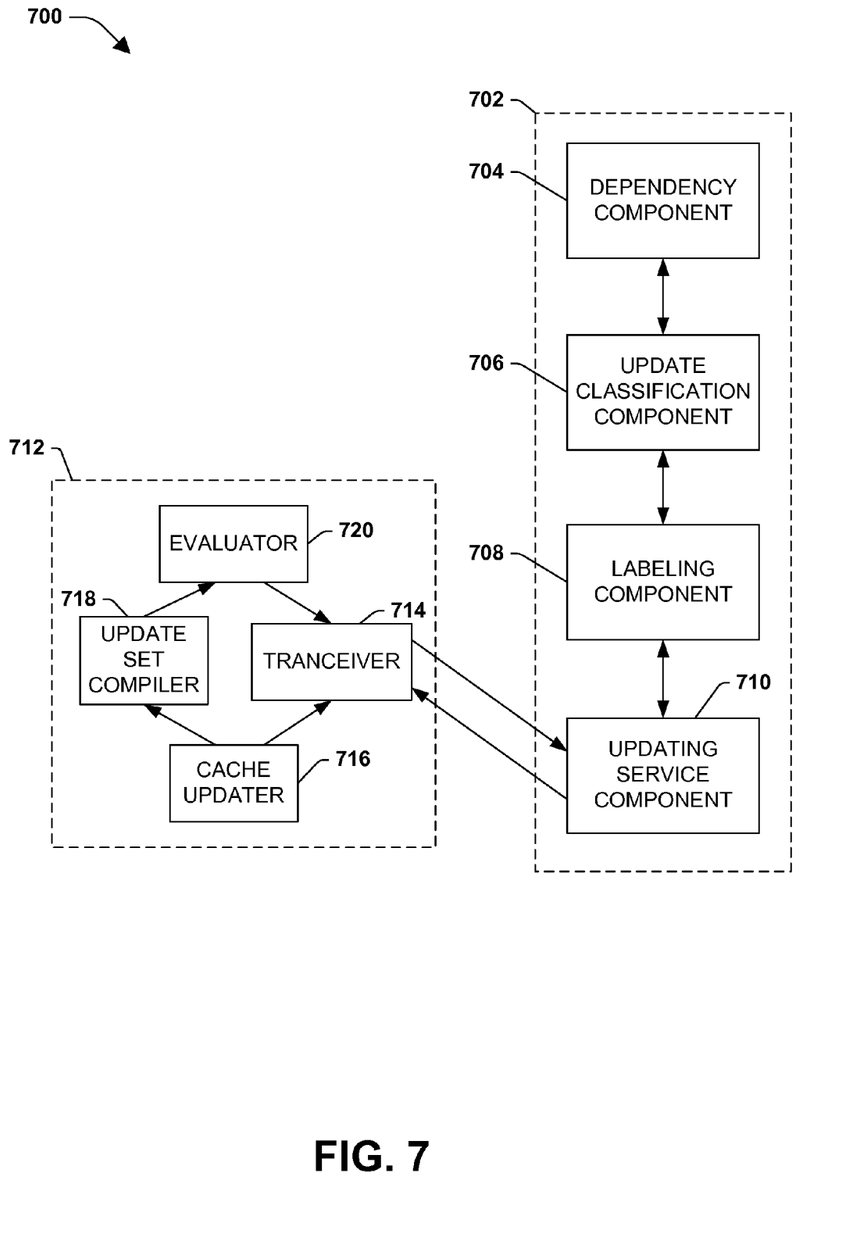
FIG. 7 illustrates an exemplary system for determining whether one or more software updates are available for a client device.

FIG. 7 illustrates an example environment 700 of an exemplary system for determining whether one or more software updates are available for a client device 712 (e.g., such as a personal computer, mobile device, tablet, etc.). More particularly, FIG. 7 illustrates an example system for transmitting updates (e.g., questions) to a client device 712 from a server 702 and/or receiving at the server one or more sync calls (e.g., comprising the updates and/or states (e.g., answers)) from the client device 712. It will be appreciated that while the example environment 700 merely illustrates a single server 702 and a single client device 712, a plurality of client devices may be operably coupled to a single server and/or an updating service may utilize a plurality of servers to communicate with the one or more client devices.

The example environment 700 comprises a dependency component 704 configured to determine update dependencies. That is, stated differently, the dependency component 704 is configured to determine whether one or more of the updates is preconditioned on a particular response to another one or more of the updates. For example, if a first update is merely provided to the client device 712 upon the client device 712 responding in a specified manner to a second update, the second may be consider a precondition (e.g., prerequisite) of the first update (e.g., if the response to the second update changes, the first update may no longer be asked to the client device 712).

By way of example, the dependency component 704 may be configured to create a model, such as a dependency tree, for example, that is indicative of relationships between respective updates. However, it will be appreciated the other analytic and/or iterative techniques, for example, may be used for determining dependencies. As another example, the dependency information may be specified by a programmer (e.g., a programmer may specify that update A is a precondition for update B), so the server 702, for example, may not comprise a dependency component 704 and/or the dependency component 704 may be configured to develop a model based merely upon specifications of the programmer regarding dependencies, for example.

The example environment 700 also comprises an update classification component 706 configured to group respective updates into at least one of two or more different sets of updates configured to be transmitted in different sync calls from the client device 712 to the server 702. By way of example, the update classification component 706 may be configured to group one or more updates into a first set of updates that are configured to be transmitted to the server 702 (e.g., or updating service component 710 thereof) in a first sync call and to group another one or more updates into a second set of updates that are configured to be transmitted to the server 702 in a second sync call. It will be appreciated that generally the first and second sets of updates are comprised of different updates, although in one embodiment, at least one update may be common to both the first and second sets of updates. That is, generally speaking, the first set of updates differs from the second set of updates by at least one update.

As was described with respect to the preceding figures, it will be appreciated that generally speaking, the updates are grouped into update sets in a manner than reduces errors (e.g., down to zero). That is, the update classification component 706 is configured to group updates so that updates that are preconditions for an update included in the update set are also included in the update set. Moreover, zero or more updates whose preconditions are satisfied by updates comprised in the update set may be grouped into the update set. In this way, omissions of a given update with the inclusion of the one or more updates that are preconditions of the given update may be much less likely to occur because the zero or more updates whose preconditions are satisfied are included into the update set, for example. Additionally, omissions of a precondition for a given update may be much less likely to occur because preconditions of updates are included in the update set, for example.

It will be appreciated that in one embodiment, the update classification component 706 may utilize a technique similar to the method 200 described with respect to FIG. 2 to group updates into one or more update sets (e.g., to create the first and second update sets). By way of example, the update classification component 706 may begin to create an update set by selecting an update as a basis update. As described above, the selection of the basis update may be arbitrary and/or basis updates may be selected according to some specified pattern and/or formulation (e.g., select respective updates represented by the lowest node on a branch in a dependency tree created by the dependency component 704 as the basis update).

After a basis update is selected, the update classification component 706 may proceed to identify zero or more updates to the update set that are preconditions to the basis update and/or include (e.g., add) the zero or more updates to the update set. It will be appreciated that the update classification component 706 may add to the update set updates that are both direct preconditions of the basis update and indirect preconditions of the basis update. For example, if the basis update (e.g., represented by node J 418 in FIG. 4) is preconditioned on a first update (e.g., represented by node G 412 in FIG. 4) and the first update is preconditioned on a second update (e.g., represented by node A 404 in FIG. 4), both the first and the second updates are may be added to the update set (e.g., where first update is a direct precondition of the basis update and the second update is an indirect precondition).

After the update classification component 706 has updated the update set to include updates that are preconditions for the basis update (e.g., if there are any preconditions), the update classification component 706 may be configured to identify zero or more updates whose preconditions are satisfied by the updates comprised in the update set and/or to include (e.g., add) those updates to the update set. That is, stated differently, the update classification component 706 may be configured to add updates whose preconditions are satisfied by the basis update and/or the zero or more updates that are preconditions for the basis update. It will be appreciated that generally speaking (e.g. to avoid errors), the update classification component 706 is merely configured to add updates whose preconditions are entirely satisfied by the included updates. For example, if a first update is preconditioned on the basis update and on a second update that is not included in the update set, the first update may not be added to the update set by the update classification component 706 (e.g., unless the second update is also added to the update set). If the first update is instead merely preconditioned on the basis update, the update classification component 706 may be configured to add the first update to the update set.

It will be appreciated that the process of creating updates sets may be created for "n" number of basis updates, where n is a number between 2 and the number of updates known to the update classification component 706. For example, in one embodiment, the update classification component 706 may be aware of 200updates, and the update classification component may create 200 update sets, one update set for respective updates (e.g., creating a 1-to-1 ratio of updates to update sets).

It will also be appreciated that, in one embodiment, the update classification component 706 may also be configured to reduce the total number of update sets and/or reduce the number of update sets that are sent in sync calls to the server 702 from the client device 712 (e.g., to reduce duplicates and/or redundancy in the transmission of update sets). For example, as described above, the update classification component 706 may be configured to determine whether one or more update sets comprise updates that are entirely comprised within another update set. If one or more update sets are identified that are entire comprised within another update set, then the one or more update sets may be deleted, discarded, and/or otherwise ignored such that a sync call is not associated merely with the one or more update sets. Stated differently, suppose a first update set was created by the update classification component 706 that comprised updates A, B, and C and a second update set was created by the update classification component 706 that comprised updates A, B, C, and D. It may be redundant to transmit a first sync call to the server 702 from the client device 712 indicative of the first set of updates and to transmit a second sync call to the server 702 from the client device 712 indicative of the second set of updates. Therefore, the update classification component 706 may recognize that updates A, B, and C are included in the second set of updates, and thus it is redundant to transmit the first sync call to the server 702. Therefore, the update classification component may discard or otherwise ignore the first set of updates in favor of the second set of updates (e.g., which comprises A, B, C, plus D).

The example environment 700 also comprises a labeling component 708 configured label respective updates in respective update sets. The labels may serve as an indication (e.g., for the client device 712) of which updates are associated with and/or may be comprised within a sync call. For example, updates comprised in the first set of updates (e.g., and sent in a first sync call) may be labeled with a "1" and updates comprised in the second set of updates (e.g., and sent in a second sync call) may be labeled with a "2." It will be appreciated that because one or more updates may be comprised in a plurality of sets, the labeling component 708 may be configured to label one or more updates with multiple labels indicative of the sets in which it is comprised.

The example environment 700 also comprises an updating service component 710 configured to manage communications between the client device 712 and the server 702 regarding updates. More particularly, the updating service component 710 is configured to determine which updates to send to the client device 712 based upon, among other things, previously received states in response to previous updates sent to the client device 712 and/or a generic set of updates (e.g., sent out prior to one or more states being received from the client device 712), for example. As an example, the updating service component 710 may determine whether one or more new updates may be sent to the client device 712 and/or whether one or more of the updates may be adjusted in a cache of the client device 712 (e.g., and answered again).

The example environment 700 further comprises a client device 712 comprising, among other things, a transceiver component 714, a cache update component 716, an update set compiler component 718, and an evaluator component 720. The transceiver component 714 is configured to, among other things, receive updates that are sent to the client device 712 from the updating service component 710 and/or to send sync calls (e.g., comprising the updates and/or states (e.g., responses to the updates)) to the updating service component 710. The transceiver component 714 may also be configured to receive software updates if it is determined by the updating service component 710, for example, that one or more software updates are useful given the hardware/software configurations of the client device 712.

The client device 712 also comprises a cache update component 716 configured to update a cache of updates on the client device 712 based at least in part upon a response from the updating service component 710. That is, stated differently, the client device 712 may comprise a cache of substantially all of the updates that the client device 712 has received from the server 702. At times, one or more of the updates comprised in the cache may be changed by the updating service component 710, for example, and the updating service component 710 may issue a notification to the cache update component 716 configured to cause the cache update component to make an adjustment to the one or more updates stored in the cache according to the change (e.g., which may include deleting the update/question from the cache).

The client device 712 also comprises an update set compiler component 718 configured to compile the updates stored in the cache into the two or more update sets as specified by the update classification component 706. That is, the update set compiler component 718 is configured to collect the updates into the previously determined sets so that the first set of updates can be transmitted in a first sync call, the second set of updates can be transmitted in a second sync call, etc. In one example, the update set compiler component 718 is configured to compile the sets of updates according to the labels assigned to respective updates by the labeling component 708. That is, in one embodiment, the client device 712 may have little to no knowledge of the relationships between updates (e.g., which updates depend upon which other updates). Therefore, the labels assigned by the labeling component 708 may be utilized by the update set compiler component 718 to determine which updates are to be comprised in which update set (e.g., and thus which updates are to be transmitted to the server 702 in which sync call).

The client device 712 also comprises an evaluator component 720 configured to evaluate respective updates and generate states (e.g., responses) to respective updates. For example, a first update may ask whether the client device 712 comprises a 64-bit architecture and a second update may ask whether the client device 712 utilizes a particular operating system. The evaluator component 720 may evaluate respective updates to determine whether the client device 712 does in fact comprise a 64-bit architecture and/or whether the client device 712 utilizes the particular operating system.

The updates comprised in a set of updates and states associated with those updates may be then be packaged in a sync call and transmitted to the server 702 via the transceiver 714. For example, a first set of updates (e.g., as determined by the update classification component 706) and corresponding states may be transmitted in a first sync call and a second set of updates and corresponding states may be transmitted in a second sync call.

It will be appreciated that the example environment 700 is merely one example environment and is not intended to be interpreted in a limiting manner such as necessarily specifying the location of particular components. Moreover, at least some of the components described above may be optional components and therefore may not be utilized in some applications. By way of example, in one embodiment, the updating service component 710 is configured to provide the client device 712 with dependency information and/or the client device 712 is configured to determine relationships between respective updates. Therefore, the update classification component 706 may be part of the client device 712, for example. Moreover, in such an embodiment, the applicability of the labeling component 708 may be reduced (e.g., and thus not included) because the client device 712 is configured to group updates into the at least two sets of updates.

Figure 8:
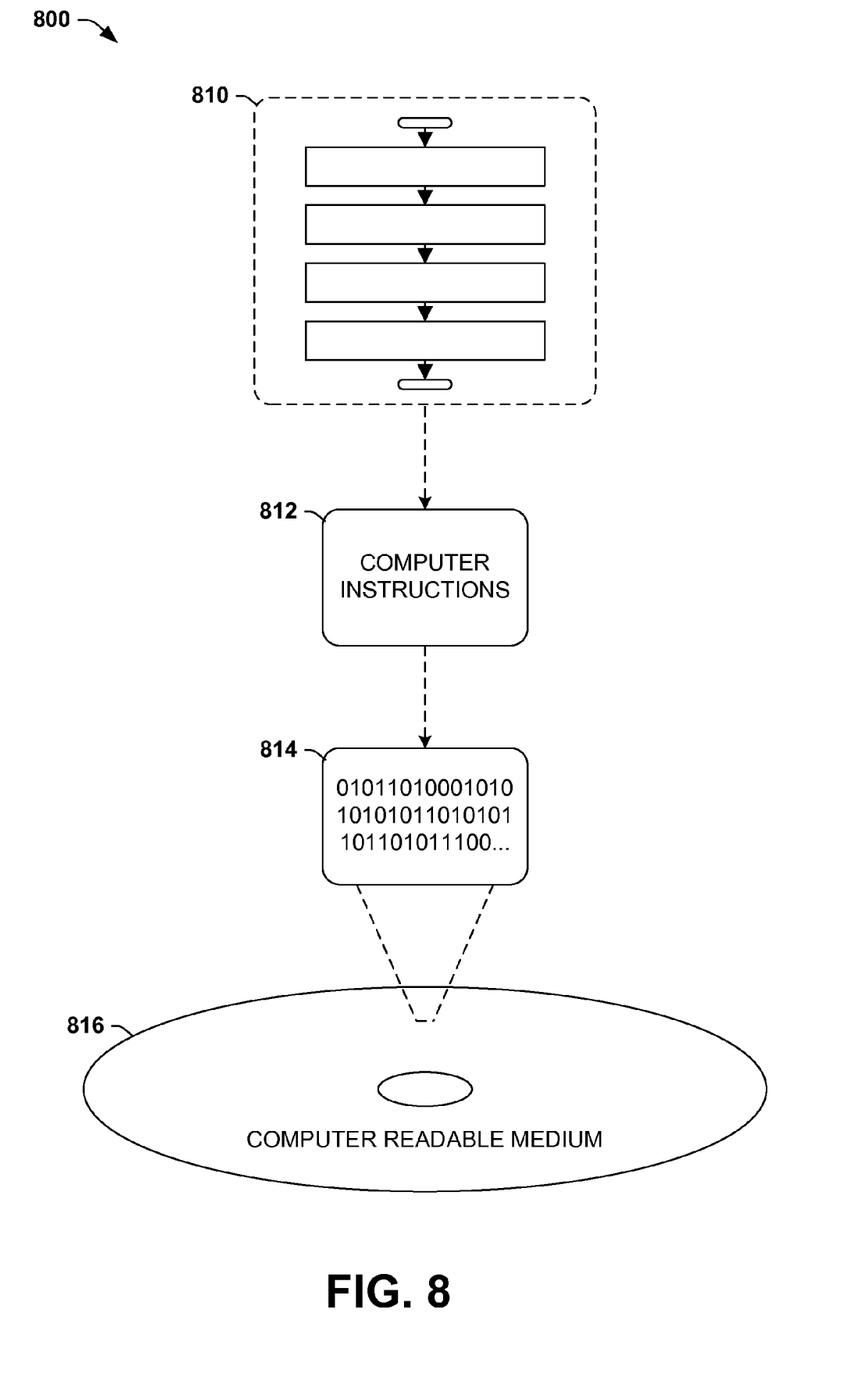
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as at least some of the exemplary method 100 of FIG. 1 and/or at least some of the exemplary method 200 of FIG. 2, for example. In another such embodiment, the processor-executable instructions 812 may be configured to implement a system, such as at least some of the exemplary system 700 of FIG. 7, for example. Many such computer-readable media 816 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
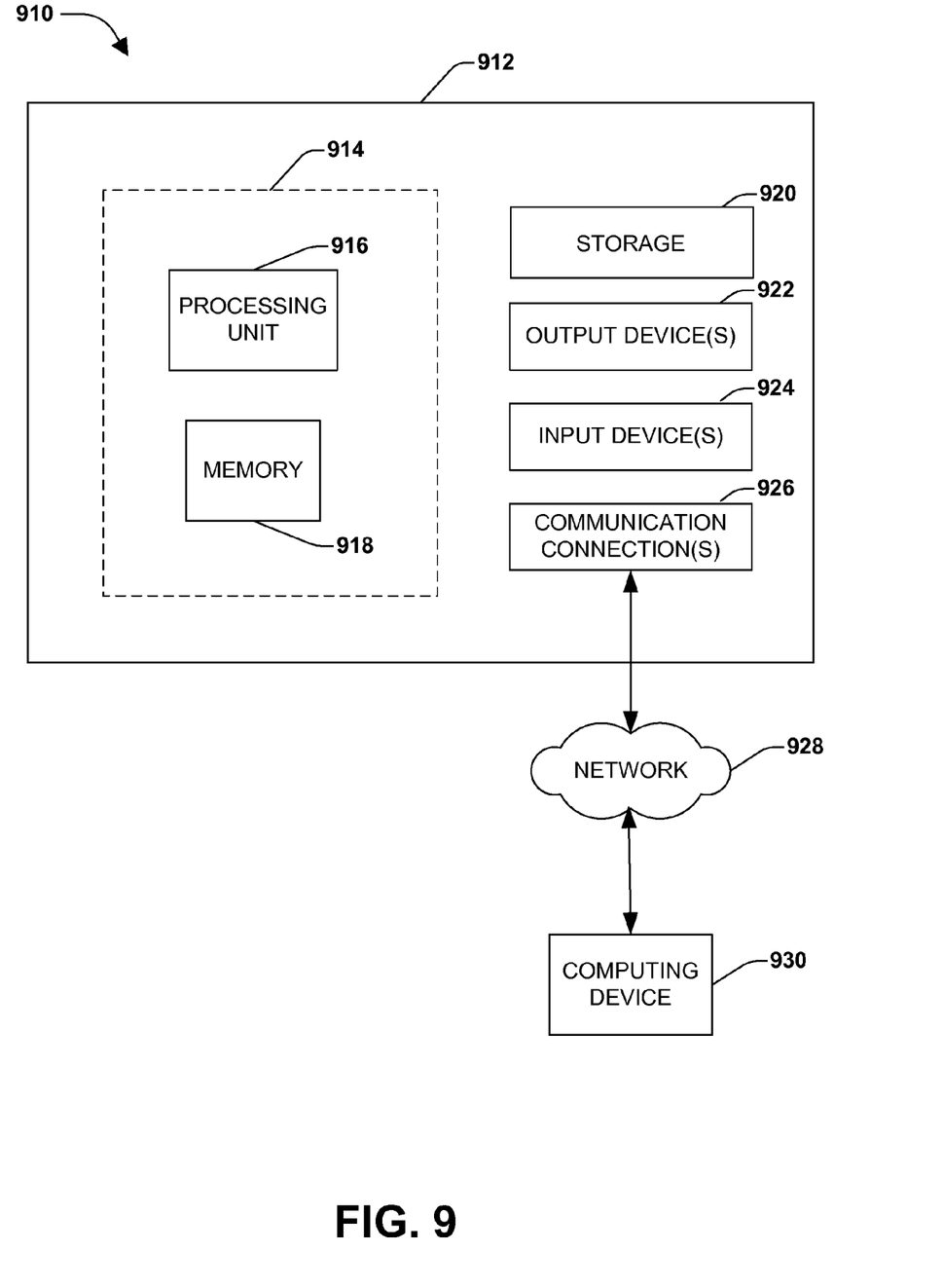
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example), or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network 928. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   preparing a sync call for transmission to an updating service, the sync call comprising a set of questions posed to a client by the updating service and a set of answers to the set of questions;
   determining that a characteristic of the sync call is not compliant with a requirement of the updating service, the determining comprising determining that at least one of:
     a number of questions in the set of questions exceeds a question limit of the updating service; or
     a number of answers in the set of answers exceeds an answer limit of the updating service; and
   dividing the set of questions and the set of answers into two or more sync calls responsive to the determining, a first sync call of the two or more sync calls comprising a first subset of questions and a first subset of answers to the first subset of questions and a second sync call of the two or more sync calls comprising a second subset of questions and a second subset of answers to the second subset of questions.

2. The method of claim 1, comprising:
   sending the first sync call and the second sync call to the updating service.

3. The method of claim 1, the determining comprising:
   determining that a data size of the sync call exceeds a data limit of the updating service.

4. The method of claim 1, at least one of:
   a first question of the set of questions comprised in both the first subset of questions and the second subset of questions, or
   a first answer of the set of answers comprised in both the first subset of answers and the second subset of answers.

5. The method of claim 1, the dividing comprising:
   selecting a first basis question from the set of questions;
   identifying zero or more questions of the set of questions that are preconditions for the first basis question; and
   identifying zero or more questions of the set of questions whose preconditions are satisfied by at least one of the first basis question or the zero or more questions that are preconditions for the first basis question.

6. The method of claim 5, the first subset of questions comprising the first basis question, the zero or more questions that are preconditions for the first basis question, and the zero or more questions whose preconditions are satisfied by at least one of the first basis question or the zero or more questions that are preconditions for the first basis question.

7. The method of claim 6, the dividing comprising:
   selecting a second basis question from the set of questions;
   identifying zero or more questions of the set of questions that are preconditions for the second basis question; and
   identifying zero or more questions of the set of questions whose preconditions are satisfied by at least one of the second basis question or the zero or more questions that are preconditions for the second basis question.

8. The method of claim 7, the second subset of questions comprising the second basis question, the zero or more questions that are preconditions for the second basis question, and the zero or more questions whose preconditions are satisfied by at least one of the second basis question or the zero or more questions that are preconditions for the second basis question.

9. The method of claim 8, the first subset and the second subset having at least one question of the set of questions in common.

10. The method of claim 1, the dividing comprising:
    generating a dependency tree, a first node in the dependency tree representing a first question of the set of questions and a second node in the dependency tree representing a second question of the set of questions and a dependency between the first question and the second question represented by a line connecting the first node to the second node.

11. The method of claim 2, the sending comprising:
    sending the first sync call to a first server associated with the updating service; and
    sending the second sync call to a second server associated with the updating service.

12. A system, comprising:
    one or more processing units; and
    memory comprising instructions that when executed by at least some of the one or more processing units perform a method comprising:
      identifying a set of questions used to identify one or more software updates for a client;

determining that a sync call comprising the set of questions does not satisfy a requirement of an updating service providing the one or more software updates, the determining comprising determining that a number of questions in the set of questions exceeds a question limit of the updating service; and dividing the set of questions into two or more sync calls responsive to the determining, a first sync call of the two or more sync calls comprising a first subset of questions and a second sync call of the two or more sync calls comprising a second subset of questions.

13. The system of claim 12, the method comprising:

labeling questions of the first subset of questions with a first label; and labeling questions of the second subset of questions with a second label.

14. The system of claim 12, the identifying performed at the updating service.

15. The system of claim 12, the identifying performed at the client.

16. The system of claim 12, the dividing comprising:

selecting a first basis question from the set of questions;

identifying zero or more questions of the set of questions that are preconditions for the first basis question; and identifying zero or more questions of the set of questions whose preconditions are satisfied by at least one of the first basis question or the zero or more questions that are preconditions for the first basis question.

17. The system of claim 16, the first subset of questions comprising the first basis question, the zero or more questions that are preconditions for the first basis question, and the zero or more questions whose preconditions are satisfied by at least one of the first basis question or the zero or more questions that are preconditions for the first basis question.

18. The system of claim 12, the determining comprising:

determining that a number of answers in a set of answers to the set of questions exceeds an answer limit of the updating service.

19. The system of claim 12, the determining comprising:

determining that a data size of the sync call exceeds a data limit of the updating service.

20. A computer readable medium, excluding signals, comprising instructions that when executed perform a method comprising:

preparing a sync call for transmission to an updating service, the sync call comprising a set of questions posed to a client by the updating service and a set of answers to the set of questions;

determining that a characteristic of the sync call is not compliant with a requirement of the updating service, the determining comprising determining that a number of answers in the set of answers exceeds an answer limit of the updating service; and dividing the set of questions and the set of answers into two or more sync calls responsive to the determining, a first sync call of the two or more sync calls comprising a first subset of questions and a first subset of answers to the first subset of questions and a second sync call of the two or more sync calls comprising a second subset of questions and a second subset of answers to the second subset of questions.

* * * * *